US008587142B2

(12) United States Patent
Kang et al.

(10) Patent No.: US 8,587,142 B2
(45) Date of Patent: Nov. 19, 2013

(54) METHOD AND SYSTEM FOR CONTROLLING WIND FARM WHEN WIND SPEED VARIES ABRUPTLY

(75) Inventors: Yong Cheol Kang, Jeonju-si (KR); Yeon Hee Kim, Wanju-gun (KR); Tai Ying Zheng, Jeonju-si (KR)

(73) Assignee: Industrial Cooperation Foundation Chonbuk National University, Jeonbuk (KR)

( * ) Notice: Subject to any disclaimer, the term of this patent is extended or adjusted under 35 U.S.C. 154(b) by 328 days.

(21) Appl. No.: 13/225,422

(22) Filed: Sep. 3, 2011

(65) Prior Publication Data

US 2012/0200086 A1 Aug. 9, 2012

(30) Foreign Application Priority Data

Feb. 9, 2011 (KR) .................. 10-2011-0011409

(51) Int. Cl.
*H02P 9/04* (2006.01)
(52) U.S. Cl.
USPC ............................. 290/44; 700/286
(58) Field of Classification Search
USPC ................... 290/44, 7; 700/286–287
See application file for complete search history.

(56) References Cited

U.S. PATENT DOCUMENTS

| 7,199,482 | B2* | 4/2007 | Hopewell ..................... 290/44 |
| 7,298,059 | B2* | 11/2007 | Delmerico et al. ............ 307/85 |
| 7,908,036 | B2* | 3/2011 | Kirchner et al. ............ 700/287 |
| 8,335,594 | B2* | 12/2012 | Altemark et al. ............ 700/287 |
| 2007/0173982 | A1 | 7/2007 | Cardinal et al. |
| 2008/0195255 | A1* | 8/2008 | Lutze et al. .................... 700/291 |
| 2012/0185414 | A1* | 7/2012 | Pyle et al. ..................... 706/11 |

FOREIGN PATENT DOCUMENTS

| DE | 10-2005-018996 A1 | 10/2006 |
| DE | 10-2009-030886 A1 | 12/2010 |
| EP | 1672778 A2 | 6/2006 |
| EP | 1790851 A2 | 5/2007 |
| EP | 2072813 A2 | 6/2009 |
| JP | 2004-285858 A | 10/2004 |
| JP | 2007-285214 A | 11/2007 |
| WO | 2009/082326 A1 | 7/2009 |

OTHER PUBLICATIONS

KIPO Notice of Allowance for Korean Patent Application No. 10-2011-0011409 which corresponds to U.S. Appl. No. 13/225,422.
European Search Report for European Application No. EP11187573 which corresponds to the above-identified application.

* cited by examiner

*Primary Examiner* — Michael Zarroli
(74) *Attorney, Agent, or Firm* — LRK Patent Law Firm

(57) ABSTRACT

The present invention relates to a method and system for controlling a wind farm when a ramp up or ramp down rate of the wind farm does not satisfy a grid-code or corresponding criteria due to an abrupt change in wind speed. The method and system for controlling a wind farm includes the steps of measuring speed and direction of wind performed outside the wind farm, sequentially controlling wind turbines if the wind speed abruptly changes considering a time for the wind to arrive at the wind turbines, determining the number of wind turbines to be controlled simultaneously so that the wind farm may satisfy the grid-code at this point, grouping the wind turbines, determining a control sequence and a control time of each group, and adjusting a control end time if stopping times of adjacent groups are overlapped when the wind turbines are stopped.

20 Claims, 5 Drawing Sheets

METHOD AND SYSTEM FOR CONTROLLING WIND FARM WHEN WIND SPEED VARIES ABRUPTLY

CROSS REFERENCE TO RELATED APPLICATION

This application claims the benefit under 35 U.S.C. 119(a) of Korean Patent Application No. 10-2011-0011409, filed on Feb. 9, 2011, the disclosure of which is incorporated by reference in its entirety for all purposes.

BACKGROUND OF THE INVENTION

1. Field of the Invention

The present invention relates to a method and system for controlling a wind farm when a ramp up or ramp down rate of the wind farm deviates from a grid-code or corresponding criteria due to an abrupt change in wind speed, and more specifically, to a method and system for determining a sequence of controlling wind turbines in the wind farm using information on wind conditions measured outside the wind farm and for controlling the wind turbines according to the control sequence so that power output of the wind farm may satisfy the ramp up or ramp down rate specified in the grid-code or corresponding criteria.

2. Background of the Related Art

A wind turbine is an apparatus for converting kinetic energy of wind into electrical energy. Speed of wind should be within a certain range in order to generate wind power. If the wind speed exceeds the upper limit of wind power generation reference speed (e.g., 25 m/s), the wind turbine should be stopped to protect the wind turbine, and if the wind speed is less than the lower limit (e.g., 3 m/s), the wind turbine stops working since it does not have sufficient energy as much as to generate power.

When the wind turbine is to be stopped, input energy is reduced to zero by controlling a pitch angle through a pitch control, and a brake is used when the wind turbine should be stopped in a speedy way. However, if the brake is used, it is disadvantageous in that the wind turbine is abraded and thus the lifespan of the wind turbine could be shortened.

Meanwhile, since the electrical energy generated by the wind turbine is affected by the strength of fluctuating wind and thus cannot maintain a constant level at all times, its quality is inferior to those of conventional power generators. In order to maintain electrical energy of high quality, a power generator in a power grid should reserve sufficient power so as to compensate increase and decrease in power output of the wind turbine. However, a large amount of power should be reserved since the power output of the wind turbine is highly variable, and thus cost of generating the electrical energy increases as a result. Since this problem is worsened if a large number of wind turbines are associated with the power grid, a grid-code is established and enforced in a lot of countries of the world, and the grid-code is also announced in Korea in June, 2010.

Since power generators in a conventional power grid have a ramp up or ramp down rate of a definite value, the grid-code specifies a regulation for increasing and decreasing power output of a wind farm while maintaining a ramp up or ramp down rate of the power output of the wind farm to be smaller than a certain value in any circumstances. If the power output increases or decreases at a rate higher than specified in the regulation, the power generators in the conventional power grid cannot compensate abrupt increase and decrease of the power output of the wind farm, and thus quality of the electrical energy is degraded.

In addition, when a strong wind blows, the wind turbine should be forcibly stopped as described above in order to protect the wind turbine. However, in the case of a large-scaled wind farm, power output of the wind farm abruptly decreases if all wind turbines simultaneously stop working, and this greatly affects power output of the power grid. On the other hand, if there is no wind, power output of the wind farm abruptly decreases since the wind turbines stop working, and it gives a great affect to the power grid, and thus the wind turbines should be forcibly stopped in order to reduce the affect.

In order to forcibly stop the wind turbines in the wind farm when a strong wind blows, a conventional technique calculates a distance $s_{ij}$ to each wind turbine and a time required for the wind to travel from a measuring apparatus to the wind turbine $s_{ij}/v$. In this method, it is assumed that a time required to forcibly stop an individual wind turbine is $t_{down}$. If the time consumed for calculation and communication is ignored, each wind turbine is forcibly stopped at a time of $t_{ij}(s_{ij}/v - t_{down})$ for a time period of $t_{down}$.

Since the wind turbines are forcibly stopped for a time period of $t_{down}$, the number of simultaneously stopped wind turbines varies, and thus power output of the wind farm forms a curve. In addition, the ramp down rate is low at a moment when the number of stopped wind turbines is small, whereas the ramp down rate is high when the number of stopped wind turbines is large, and thus the ramp down rate may exceed the grid-code.

SUMMARY OF THE INVENTION

Accordingly, the present invention has been made in view of the above-mentioned problems occurring in the prior art, and it is an object of the present invention to provide a method and system for controlling a wind farm, in which a ramp up or ramp down rate of the wind farm is controlled not to deviate from a grid-code when the ramp up or ramp down rate of a wind farm deviates from the grid-code or corresponding criteria, and thus quality and reliability of electrical energy in an entire power grid can be improved.

To accomplish the above objects, according to an aspect of the present invention, there is provided a method for controlling a wind farm, the method including the steps of: measuring wind conditions including characteristics of the wind speed and wind direction, performed outside the wind farm; determining whether or not the ramp up or ramp down rate of the wind farm deviates from the grid-code due to the change in the wind speed measured in the step of measuring wind conditions, and determining whether or not the measured wind speed is within a range of wind power generation reference speed; determining the number of wind turbines $N_{WT}$ to be controlled simultaneously, if the ramp up or ramp down rate of the wind farm deviates from the grid-code; grouping the wind turbines into first to N-th groups; determining a control start time $T_{Gn,start}$ and a control end time $T_{Gn,end}$ of each group formed in the grouping step; and controlling the wind turbines in each group within the determined control start time $T_{Gn,start}$ and control end time $T_{Gn,end}$.

In the step of determining the number of wind turbines to be controlled simultaneously, the number of wind turbines to be controlled simultaneously is determined such that a total of the ramp up or ramp down rates of the wind turbines in each group does not exceed a ramp up or ramp down rate of the grid-code, and a ramp down rate of a wind turbine is determined within a range capable of stopping the wind turbine through a pitch control and/or an electrical control when each of the wind turbines is stopped.

The step of grouping the wind turbines includes the steps of: calculating a distance $s_{ij}$ between wind and each of the wind turbines using the measured wind direction α, calculating a time for the wind to arrive at each wind turbine using the calculated distance and the measured wind speed v, and arranging a control start sequence of the wind turbines in order of shortest arrival time; and sequentially grouping the wind turbines to be controlled simultaneously in order of the control start sequence.

A time required for the wind to arrive at a wind turbine at which the wind arrives earliest in each group is determined as the control end time $T_{Gn,end}$, and a value calculated by subtracting a control processing time $t_{ctrl}$ from the control end time $T_{Gn,end}$ is determined as the control start time $T_{Gn,start}$ of each group, in which the control processing time $t_{ctrl}$ is calculated by dividing a variance of wind power generation of each group expected from the change in the wind speed by the ramp up or ramp down rate $R_{GC}$ of the grid-code.

If the control times of adjacent groups are overlapped, the step of adjusting the control end time $T_{Gn,end}$ and the control start time $T_{Gn,start}$ of a corresponding group is included after the step of deriving the control start time $T_{Gn,start}$. The step of adjusting the control end time $T_{Gn,end}$ and the control start time $T_{Gn,start}$ of a corresponding group includes the step of adjusting the control end time $T_{Gn,end}$ and the control start time $T_{Gn,start}$ by moving ahead the control start time $T_{Gn,start}$ and the control end time $T_{Gn,end}$ of a first controlled group as much as the overlapped time.

To accomplish the above objects, according to another aspect of the present invention, there is provided a system for controlling a wind farm, the system including: an operation unit for receiving information on wind conditions from outside, determining whether or not a ramp up or ramp down rate of the wind farm deviates from a grid-code due to a change in wind speed and whether or not the wind speed is within a range of wind power generation reference speed, determining the number of wind turbines $N_{WT}$ to be controlled simultaneously if the ramp up or ramp down rate of the wind farm deviates from the grid-code, grouping the wind turbines into first to N-th groups, and determining a control start time $T_{Gn,start}$ and a control end time $T_{Gn,end}$ of each group; and a control unit for controlling the wind turbines based on the control start time $T_{Gn,start}$ and the control end time $T_{Gn,end}$ derived by the operation unit.

The operation unit determines the number of wind turbines to be controlled simultaneously such that a total of the ramp up or ramp down rates of the wind turbines in each group does not exceed a ramp up or ramp down rate of the grid-code when the wind speed deviates from the range of wind power generation reference speed, and determines a ramp down rate of a wind turbine within a range capable of braking the wind turbine through a pitch control and/or an electrical control when each of the wind turbines is braked.

The operation unit calculates a distance $s_{ij}$ between the front side of wind and each of the wind turbines using measured wind direction α, calculates a time for the wind to arrive at each wind turbine using the calculated distance and measured wind speed v, arranges a control start sequence of the wind turbines in order of shortest arrival time, and sequentially groups the wind turbines in order of the control start sequence. The operation unit determines a time required for the wind to arrive at a wind turbine at which the wind arrives earliest in each group as the control end time $T_{Gn,end}$, and determines a value calculated by subtracting a control processing time $t_{ctrl}$ from the control end time $T_{Gn,end}$ as the control start time $T_{Gn,start}$, in which the control processing time $t_{ctrl}$ is calculated by dividing a variance of wind power generation of each group expected from the change in the wind speed by the ramp up or ramp down rate $R_{GC}$ of the grid-code.

If the control times of adjacent groups are overlapped, the operation unit performs an operation of adjusting the control end time $T_{Gn,end}$ and the control start time $T_{Gn,start}$ after performing the operation of deriving the control start time $T_{Gn,start}$, and the operation of adjusting the control end time $T_{Gn,end}$ and the control start time $T_{Gn,start}$ adjusts the control end time $T_{Gn,end}$ and the control start time $T_{Gn,start}$ by moving ahead the control start time $T_{Gn,start}$ and the control end time $T_{Gn,end}$ of a first controlled group as much as the overlapped time.

To accomplish the above objects, the system for controlling a wind farm further includes a wind condition measuring apparatus for measuring the wind conditions including characteristics of the wind speed and wind direction, performed outside the wind farm. The wind condition measuring apparatuses are disposed in plurality in a polygonal form, and at least three or more wind condition measuring apparatuses are disposed outside the wind farm. The wind condition measuring apparatuses are disposed in at least two or more layers outside the wind farm. In addition, the wind condition measuring apparatuses are disposed to be apart from the wind farm by a distance farther than a value calculated by multiplying capacity of the wind farm by maximum wind speed of a corresponding region and then dividing a result of the multiplication by the grid-code.

DETAILED DESCRIPTION OF THE PREFERRED EMBODIMENT

Hereinafter, a preferred embodiment of a method and system for controlling a wind farm (although the wind farm include at least one or more wind turbines and is generally configured with a plurality of wind turbines, the present invention can be applied to control one wind turbine) when speed of wind abruptly changes and thus a ramp up or ramp down rate of the wind farm deviates from a grid-code or corresponding criteria will be described in detail with reference to the attached drawings.

In the present invention, the wind farm is controlled to increase generation of power of a wind turbine to meet the grid-code when the ramp up rate of the wind farm deviates from the grid-code, and the wind farm is controlled to decrease generation of power of the wind turbine to meet the grid-code when the ramp down rate of the wind farm deviates from the grid-code. In addition, if the wind speed deviates from a range of wind power generation reference speed, the wind farm is controlled to stop wind turbines so as to meet the grid-code.

Figure 1:
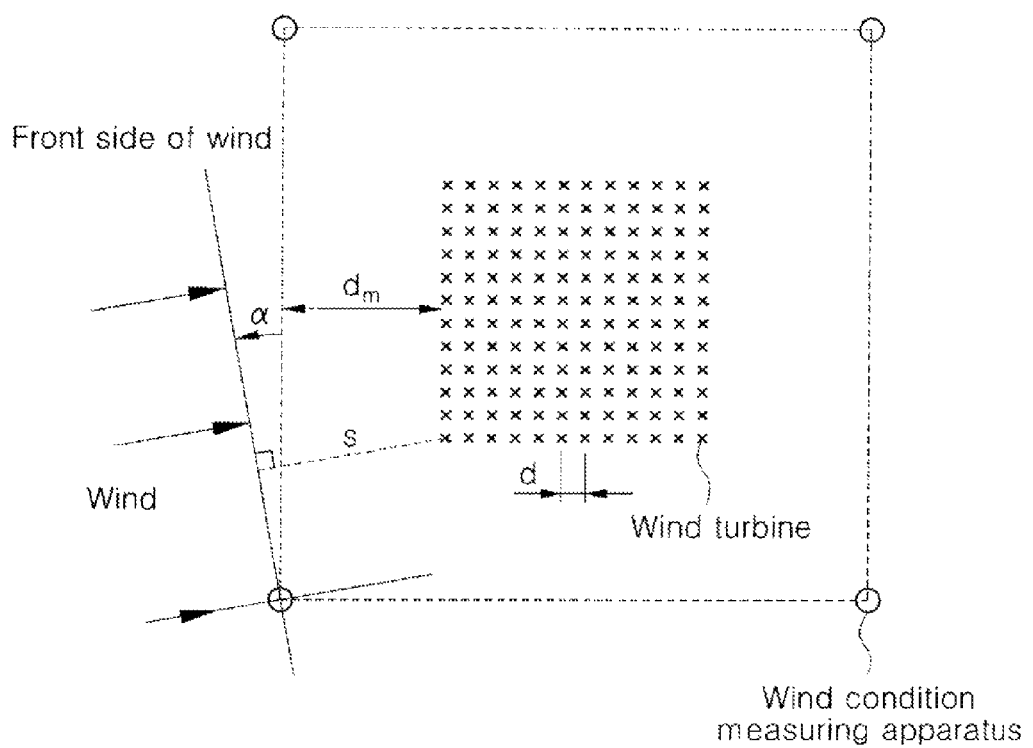
FIG. 1 is a view showing the configuration of a wind farm for verifying performance of the present invention.
Figure 2A:
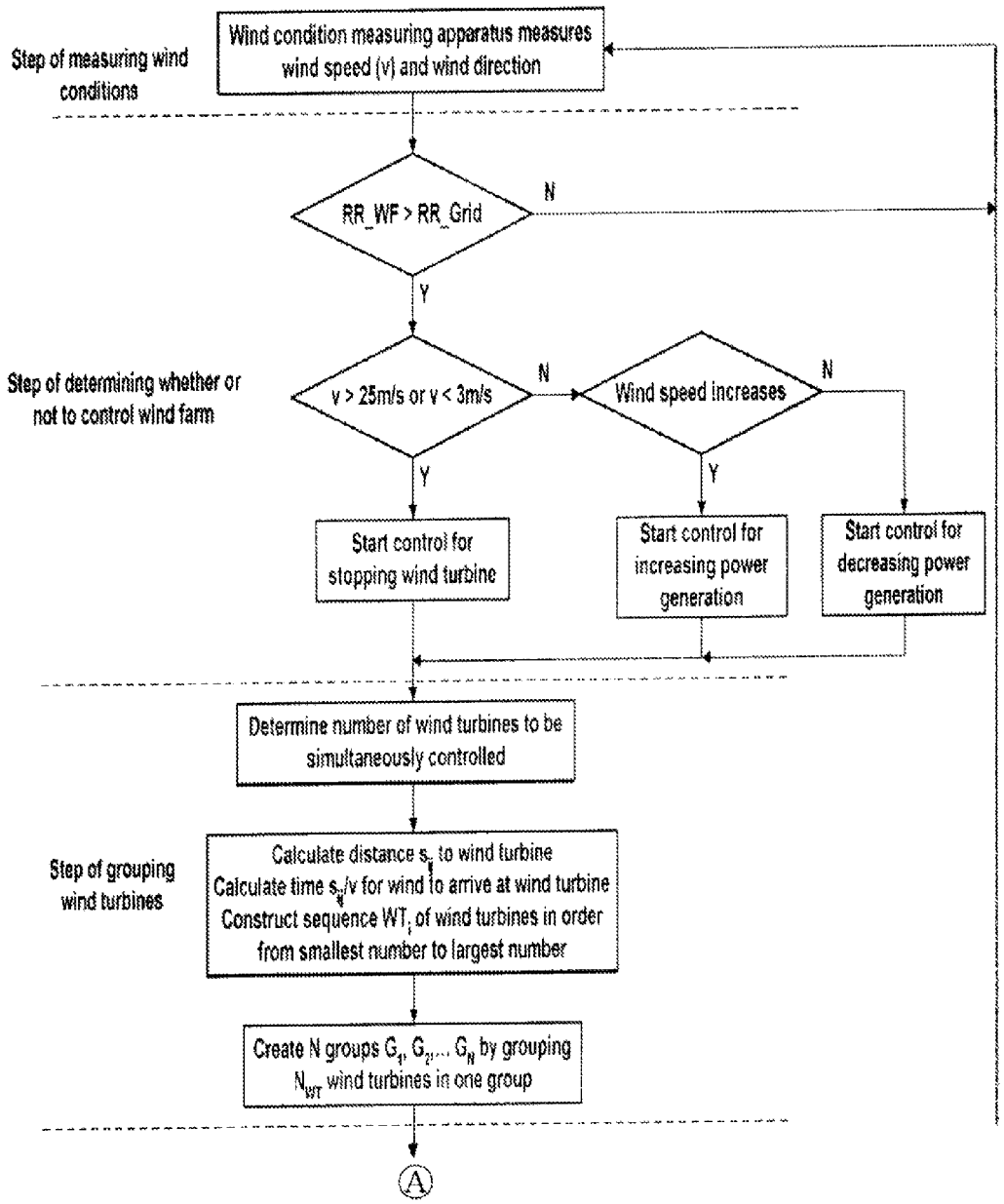
FIG. 2 is a flowchart illustrating a case where a ramp up or ramp down rate of a wind farm deviates from a grid-code according to the present invention.
Figure 2B:
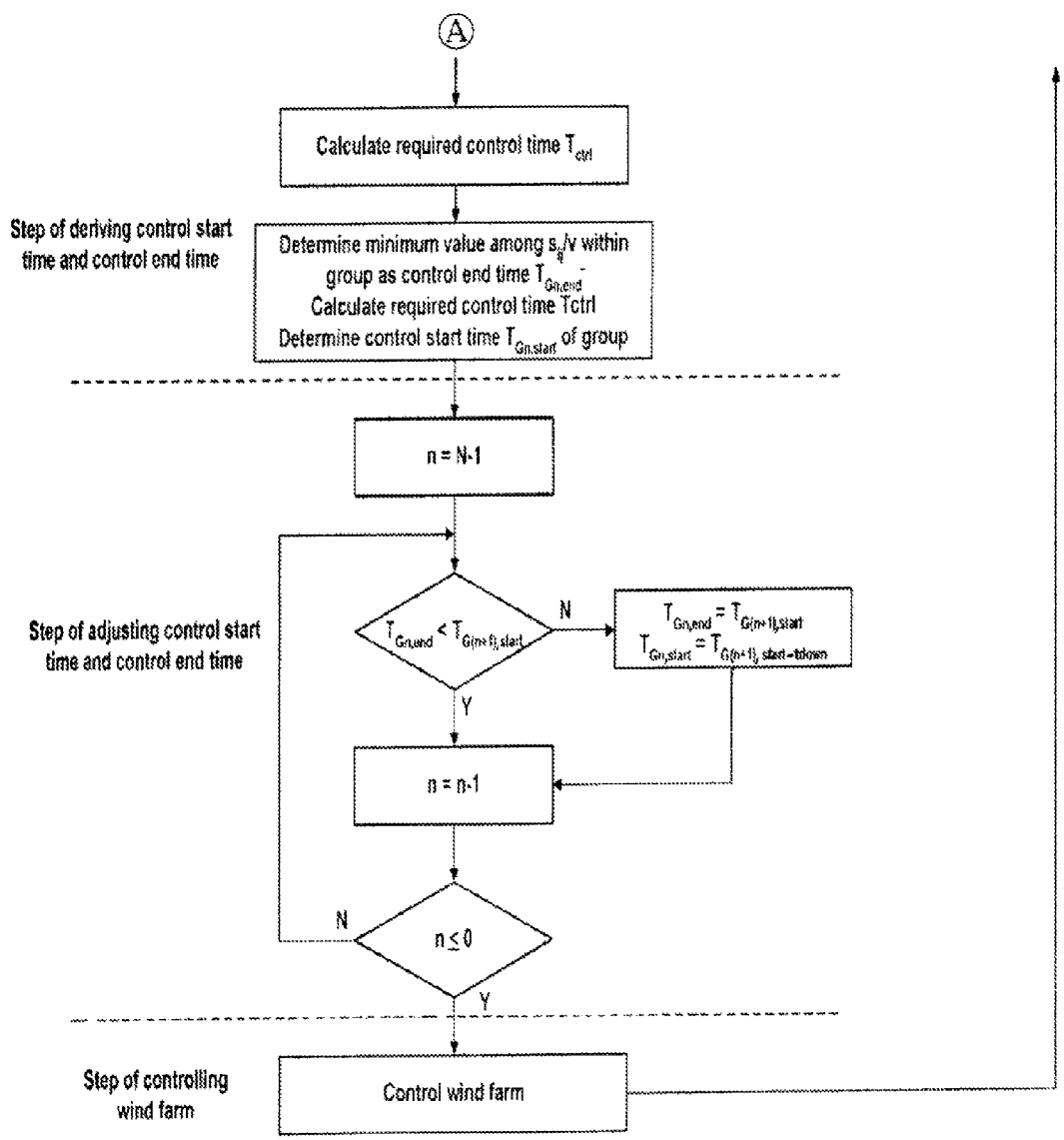

FIG. 1 is a view showing the configuration of a wind farm for verifying performance of the present invention, and FIGS. 2A and 2B are a flowchart illustrating a case where a ramp up or ramp down rate of a wind farm deviates from a grid-code according to the present invention. Meanwhile, the wind farm can be constructed in a variety of forms including a rectangular form, and wind condition measuring points can be disposed in a polygonal form to be placed in a variety of positions depending on the form of the wind farm. However, in order to describe the present invention further easily, a wind farm constructed in a rectangular form as shown in FIG. 1 is described as an embodiment, in which wind condition measuring points are disposed in a form the same as that of the wind farm, and speed of wind changes abruptly due to a strong wind.

Speed v and direction q of wind are measured outside the wind farm, and there may be a variety of measuring methods. As an embodiment, wind condition measuring apparatuses are disposed outside the wind farm to measure the speed and direction of wind. Information on the measured speed v and direction q of wind is transferred to an operation unit.

The operation unit determines whether or not the ramp up or ramp down rate of the wind farm deviates from the grid-code due to a change in the wind speed and whether or not the wind speed is within the range of wind power generation reference speed, based on the information on the wind speed v measured outside the wind farm, and if the wind speed abruptly changes and thus the ramp up or ramp down rate of the wind farm does not satisfy the ramp up or ramp down rate $R_{GC}$ of the grid-code, the operation unit determines the number of wind turbines $N_{WT}$ to be controlled simultaneously.

There are a variety of methods for determining the number of wind turbines $N_n$ to be stopped simultaneously when the measured wind deviates from the range of wind power generation reference speed and reaches a speed exceeding the upper limit or lower limit (although wind power cannot be generated currently if the wind speed is lower than 3 m/s or higher than 25 m/s, this can be changed later depending on development of techniques). In an embodiment of the present invention, the ramp down rate $R_{WT}$ of each wind turbine is determined within a range that does no harm to the wind turbine when the wind turbine is stopped. For example, the ramp down rate $R_{WT}$ of each wind turbine is determined within a range capable of stopping the wind turbine through a pitch control and/or an electrical control, and the number of wind turbines $N_{WT}$ to be simultaneously stopped is determined such that the total of ramp down rates of wind turbines in each group does not exceed the ramp down rate of the grid-code. The ramp down rate $R_{WT}$ of the wind turbine is determined through the pitch control within a range capable of controlling the wind turbine in order to prevent the lifespan of the wind turbine from being reduced due to abrasion of the wind turbine occurred when the wind turbine is stopped using a brake. Since the wind turbine can be controlled more precisely through the electrical control compared to the pitch control, it is efficient to perform the electrical control or both the electrical and pitch controls simultaneously if changes in the wind speed are small, and thus the number of wind turbines $N_{WT}$ to be simultaneously stopped is determined taking this into account.

On the other hand, if the ramp up or ramp down rate of the wind farm deviates from the ramp up or ramp down rate of the grid-code due to a change in the wind speed while the measured wind speed is within the range of wind power generation reference speed, the number of wind turbines $N_{WT}$ to be controlled simultaneously is determined such that the total of the ramp up or ramp down rates of wind turbines in each group does not exceed the ramp up or ramp down rate of the grid-code. If the wind speed is reduced and the ramp down rate of the wind farm deviates from the grid-code, the ramp down rate $R_{WT}$ of each wind turbine is determined within a range that does no harm to the wind turbine when the wind turbine is stopped. For example, the ramp down rate is determined within a range capable of stopping the wind turbine through a pitch control and/or an electrical control. This is to prevent abrasion of the wind turbine occurred when the wind turbine is stopped using a brake.

After determining the number of wind turbines $N_{WT}$ to be controlled simultaneously in each group, a step of grouping wind turbines is processed. The operation unit calculates a distance $s_{ij}$ from the front side of wind to each wind turbine based on the speed v and direction q of the wind received from the wind condition measuring apparatuses placed outside the wind farm. If the smallest angle among the angles formed between the outer line connecting the wind condition measuring apparatuses and the front side of the wind is α, and the distance from a wind turbine placed at an outermost position in the wind farm to the outer line connecting the wind condition measuring apparatuses is $d_m$, the distance $s_{11}$ to a wind turbine placed at a position nearest to the wind is as shown below.

$$s_{11}=d_m*(1+\tan \alpha)*\cos \alpha \qquad \text{[Mathematical expression 1]}$$

If the distance between adjacent wind turbines is d, a distance $s_{1j}$ from a wind turbine placed in the same row as that of a wind turbine placed at a position nearest to the wind to the front side of the wind is as shown below.

$$s_{1j}=s_{11}+d*(j-1)*\sin \alpha, \text{ where } j=1, \ldots, n \qquad \text{[Mathematical expression 2]}$$

A distance $s_{ij}$ from each wind turbine in a second row or higher to the front side of the wind is as shown below.

$$s_{ij}=s_{(i-1)j}+d*\cos \alpha, \text{ where } i=2, \ldots, n \qquad \text{[Mathematical expression 3]}$$

The operation unit obtains a time $s_{ij}/v$ for the wind to arrive at each wind turbine by dividing a distance from the front side of the wind to each wind turbine by the speed v of the wind, and constructs a sequence of time $WT_i$ by arranging the time $s_{ij}/v$ in order of a smallest value to a largest value. If $N_{WT}$ wind turbines are grouped into one group from the sequence of times $WT_i$ required for the wind to arrive at each wind turbine, N groups ($G_1, G_2, \ldots G_N$) are created.

If the step of grouping the wind turbines within the wind farm is completed, the operation unit performs the step of deriving a control start time $T_{GN,start}$ and a control end time $T_{GN,end}$ of the wind turbines in each group.

As an embodiment of deriving the control start time $T_{GN,start}$ and the control end time $T_{GN,end}$, in the present invention, time of the wind for arriving at the nearest wind turbine is determined as the control end time $T_{GN,end}$ in each group, considering that control on the wind turbines should be completed in each group before the wind arrives. A control processing time $t_{ctrl}$ should be calculated in order to derive the control start time $T_{GN,start}$.

The control processing time $t_{ctrl}$ is determined by dividing a variance of wind power generation of each group by the ramp up or ramp down rate $R_{GC}$ of the grid-code.

$$t_{ctrl} = \text{variance of wind power generation of each group}/R_{GC} \qquad \text{[Mathematical expression 4]}$$

Once the control processing time $t_{ctrl}$ is calculated through the operation describe above, a time $T_{Gn,end}-t_{ctrl}$ calculated by subtracting the control processing time $t_{ctrl}$ from the control end time $T_{GN,end}$ is determines as the control start time $T_{GN,start}$ of each group. The control times of each group can be derived through the operations described above, and the operation unit transfers information on the control start time $T_{GN,start}$ and the control end time $T_{GN,end}$ to the control unit.

The control unit controls the wind turbines using the information on the control start time $T_{GN,start}$ and the control end time $T_{GN,end}$ received from the operation unit. The control unit controls to stop the wind turbines in the wind farm if the wind speed deviates from the range of wind power generation reference speed, to increase power generation speed of the wind turbines if the ramp up rate of the wind farm deviates from the grid-code, and to decrease power generation speed of the wind turbines if the ramp down rate of the wind farm deviates from the grid-code.

On the other hand, control times of adjacent groups may overlap if the control start time and the control end time are calculated in the method described above to control the wind farm. If the control end time $T_{Gk,end}$ of the k-th group is behind the control start time $T_{Gk+1,start}$ of the k+1-th group, the number of simultaneously controlled wind turbines is larger than $N_{WT}$ since control on the k+1-th group starts while control on the k-th group is performed. Accordingly, the ramp up or ramp down rate of the wind farm exceeds the ramp up or ramp down rate of the grid-code $R_{GC}$, and thus the objects of the present invention cannot be accomplished. Therefore, a procedure of confirming whether or not control times of the groups overlap with one another and adjusting the control times is required. If the control start time of the k+1-th group is delayed, wind turbines are controlled even after the wind arrives, and thus wind turbines of the k-th group should be started earlier. There may be a variety of control time adjusting methods for avoiding overlaps of the control times among the adjacent groups. In the present invention, as an embodiment, the control times are adjusted by confirming whether or not the control times are overlapped, in a reverse order starting from the N-th group to the first group, and then moving ahead the control start time $T_{GN,end}$ and the control end time $T_{GN,end}$ of each group as much as the overlapped time period $T_{Gk,end}-T_{Gk+1,start}$.

If the wind turbines are controlled by the group within the adjusted control start time and control end time, the wind farm can be controlled while satisfying the grid-code.

The wind farm control system of the present invention basically includes the operation unit and the control unit described above as constitutional components and may additionally include the wind condition measuring apparatuses. The wind condition measuring apparatus can be manufactured in various forms, and it is manufactured in the form of a tower as an embodiment and measures speed, direction, and the like of wind.

The wind condition measuring apparatus can be disposed in a variety of forms depending on whether or not the wind farm is installed on the coast or on the land and depending on diverse installation environments. It is advantageous to dispose a plurality of wind condition measuring apparatuses outside the wind farm in order to further efficiently grasp information on the wind conditions. Since changes or errors in the wind speed or wind direction caused by friction to the ground surface can be further easily determined and analyzed as the number of wind condition measuring apparatuses increases, the wind condition measuring apparatuses can be diversely disposed depending on the form of the wind farm, including the rectangular form proposed in the present invention as an embodiment. In addition, if the wind condition measuring apparatuses are disposed in at least two or more layers outside the wind farm, trends in changes of wind speed and the like can be measured, and information on wind conditions affecting the wind farm can be further accurately measured through the trends.

On the other hand, if the wind condition measuring apparatus is disposed at a position farther than a certain distance from the wind farm, it is possible to avoid a problem such that the wind farm cannot be controlled in real-time since an operation time for controlling the wind farm and a time consumed to control the wind farm are not enough. There may be a variety of methods for calculating the distance, and the distance is calculated by multiplying the capacity of the wind farm by the maximum wind speed of a corresponding region and then dividing a result of the multiplication by the ramp up or ramp down rate of the grid-code.

$$d_m = \text{capacity of wind farm} * \text{maximum wind speed of corresponding region}/R_{GC} \qquad \text{[Mathematical expression 5]}$$

Figure 3:
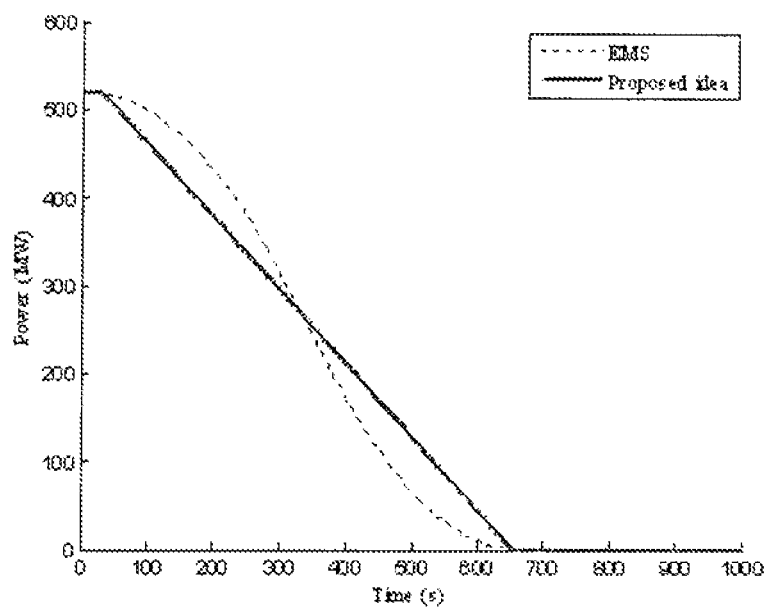
FIG. 3 is a graph showing a result of simulating electric power of a wind farm according to a conventional technique and the present invention, when the wind speed is 30 m/s and the incident angle is 0°.

FIG. 3 is a graph showing a result of simulating electric power of a wind farm according to a conventional technique and the present invention, when the wind speed is 30 m/s and the incident angle is 0°. The dotted blue line shows a result of a conventional method, and the solid red line shows a result of applying the present invention. The ramp down rate is constant in the present invention and varies in the conventional method, since the number of simultaneously stopped wind turbines varies. In this case, the amount of power generated in the proposed method is 102% of that of a conventional method, and thus it is understood that they are almost similar to each other.

Figure 4:
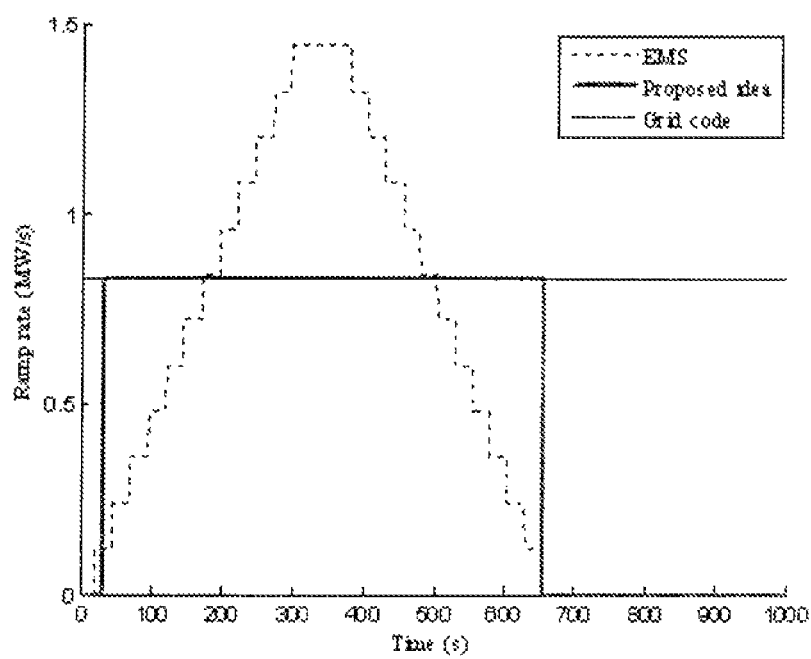
FIG. 4 is a graph comparing ramp down rates of a wind farm according to a conventional technique and the present invention with a ramp down rate of a grid-code, when the wind speed is 30 m/s and the incident angle is 0°.

FIG. 4 is a graph comparing ramp down rates of a wind farm according to a conventional technique and the present invention with a ramp down rate of a grid-code, when the wind speed is 30 m/s and the incident angle is 0°. The dotted blue line is a ramp down rate of a conventional method, and the solid red line is a ramp down rate in the case of applying the present invention. In the conventional method, the time period during which the ramp down rate of the wind farm exceeds the ramp down rate of the grid-code (0.83 MW/s) is 335 seconds, and the maximum ramp down rate of the wind farm is 1.44 MW/s. On the other hand, there is no time period during which the ramp down rate of the wind farm exceeds the ramp down rate of the grid-code in the present invention. In addition, since power generation of the wind farm abruptly decreases in the conventional method, power of 114.35 MW should be reserved separately in order to supply power for the shortage of power generation from the power grid. However, in the present invention, since the ramp down rate of the wind farm does not exceed the ramp down rate of the grid-code, power does not need to be reserved separately for the case of abrupt decrease in the power generation.

Figure 5:
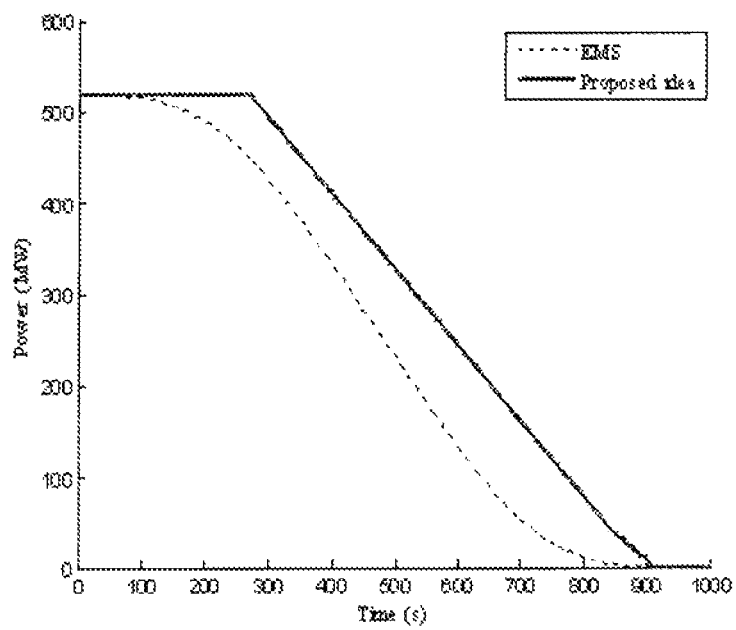
FIG. 5 is a graph showing a result of simulating electric power of a wind farm according to a conventional technique and the present invention, when the wind speed is 30 m/s and the incident angle is 45°.
Figure 6:
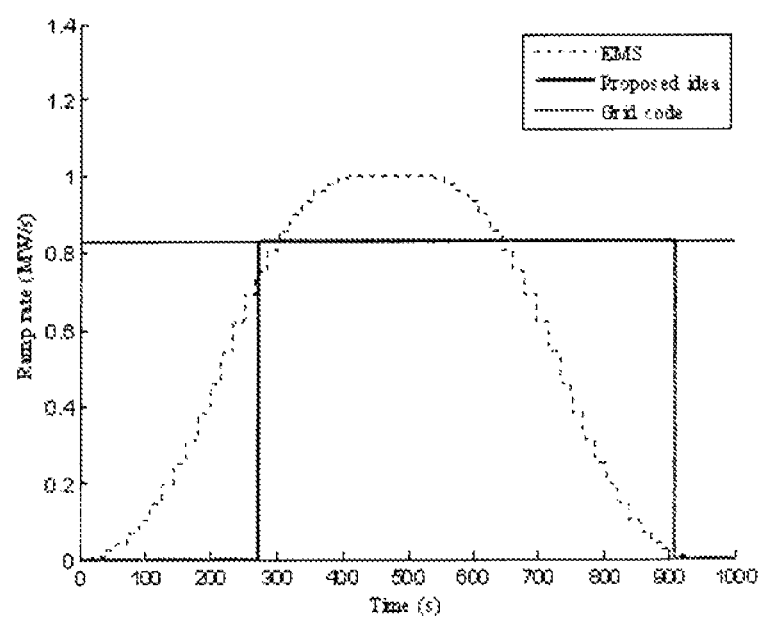
FIG. 6 is a graph comparing ramp down rates of a wind farm according to a conventional technique and the present invention with a ramp down rate of a grid-code, when the wind speed is 30 m/s and the incident angle is 45°.

FIG. 5 is a graph showing a result of simulating electric power of a wind farm according to a conventional technique and the present invention, when the wind speed is 30 m/s and the incident angle is 45°, and FIG. 6 is a graph comparing ramp down rates of a wind farm according to a conventional technique and the present invention with a ramp down rate of a grid-code, when the wind speed is 30 m/s and the incident angle is 45°. As shown in FIG. 5, the method of the present invention may supply energy as much as 1.23 times of the conventional method. As shown in FIG. 6, in the conventional method, the time period during which the ramp down rate of the wind farm exceeds the ramp down rate of the grid-code is 340 seconds, and the maximum ramp down rate of the wind farm is 1.0019 MW/s. However, the grid-code is satisfied at all times in the present invention. In addition, since power generation of the wind farm abruptly decreases in the conventional method, power of 44.77 MW should be reserved separately in order to supply power for the shortage of power generation from the power grid. However, power does not need to be reserved separately in the present invention.

According to the present invention, since the wind farm can be controlled to stop, increase, or decrease power output of the wind farm while satisfying the ramp up or ramp down rate proposed in the grid-code, the power grid does not need to prepare reserve power separately for the case where the ramp up or ramp down rate of the wind farm deviates from the grid-code. In addition, more energy can be generated compared to the conventional method of forcibly stopping a wind turbine, and it is possible to calculate a ramp down rate that does no harm to the wind turbine when the wind turbine is stopped or power generation of the wind turbine is decreased. Furthermore, since the degree of variance in the power output of the wind farm can be reduced, quality of the wind power energy can be improved.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method for controlling a wind farm when a ramp up or ramp down rate of the wind farm deviates from a grid-code or corresponding criteria due to an abrupt change in wind speed, the method comprising the steps of:
    measuring wind conditions including characteristics of the wind speed and wind direction, performed outside the wind farm;
    determining whether or not the ramp up or ramp down rate of the wind farm deviates from the grid-code due to the change in the wind speed measured in the step of measuring wind conditions, and determining whether or not the measured wind speed is within a range of wind power generation reference speed;
    determining the number of wind turbines $N_{WT}$ to be controlled simultaneously, if the ramp up or ramp down rate of the wind farm deviates from the grid-code;
    grouping the wind turbines into first to N-th groups;
    determining a control start time $T_{Gn,start}$ and a control end time $T_{Gn,end}$ of each group formed in the grouping step; and
    controlling the wind turbines in each group within the determined control start time $T_{Gn,start}$ and control end time $T_{Gn,end}$.

2. The method according to claim 1, wherein in the step of determining the number of wind turbines to be controlled simultaneously, the number of wind turbines to be controlled simultaneously is determined such that a total of the ramp up or ramp down rates of the wind turbines in each group does not exceed a ramp up or ramp down rate of the grid-code.

3. The method according to claim 2, wherein a ramp down rate of a wind turbine is determined within a range capable of braking the wind turbine through a pitch control and/or an electrical control when each of the wind turbines is braked.

4. The method according to claim 1, wherein the step of grouping the wind turbines includes the steps of:
    calculating a distance $s_{ij}$ between wind and each of the wind turbines using the measured wind direction α, calculating a time for the wind to arrive at each wind turbine using the calculated distance and the measured wind speed v, and arranging a control sequence of the wind turbines in order of shortest arrival time; and
    sequentially grouping the wind turbines to be controlled simultaneously in order of the control start sequence.

5. The method according to claim 1, wherein a time required for the wind to arrive at a wind turbine at which the wind arrives earliest in each group is determined as the control end time $T_{Gn,end}$.

6. The method according to claim 1, wherein a value calculated by subtracting a control processing time $t_{ctrl}$ from the control end time $T_{Gn,end}$ is determined as the control start time $T_{Gn,start}$, in which the control processing time $t_{ctrl}$ is calculated by dividing a variance of wind power generation of each group expected from the change in the wind speed by the ramp up or ramp down rate $R_{GC}$ of the grid-code.

7. The method according to claim 1, wherein if the control times of adjacent groups are overlapped, the step of adjusting the control end time $T_{Gn,end}$ and the control start time $T_{Gn,start}$ of each group is included after the step of deriving the control start time $T_{Gn,start}$.

8. The method according to claim 7, wherein the step of adjusting the control end time $T_{Gn,end}$ and the control start time $T_{Gn,start}$ includes the step of adjusting the control end time $T_{Gn,end}$ and the control start time $T_{Gn,start}$ in a reverse order starting from the N-th group to the first group by moving ahead the control start time $T_{Gn,start}$ and the control end time $T_{Gn,end}$ of a first controlled group as much as the overlapped time.

9. A system for controlling a wind farm when a ramp up or ramp down rate of the wind farm deviates from a grid-code or corresponding criteria, the system comprising:
    an operation unit for receiving information on wind conditions from outside, determining whether or not the ramp up or ramp down rate of the wind farm deviates from the grid-code due to a change in wind speed and whether or not the wind speed is within a range of wind power generation reference speed, determining the number of wind turbines $N_{WT}$ to be controlled simultaneously if the ramp up or ramp down rate of the wind farm deviates from the grid-code, grouping the wind turbines into first to N-th groups, and determining a control start time $T_{Gn,start}$ and a control end time $T_{Gn,end}$ of each group; and
    a control unit for controlling the wind turbines based on the control start time $T_{Gn,start}$ and the control end time $T_{Gn,end}$ determined by the operation unit.

10. The system according to claim 9, wherein the operation unit determines the number of wind turbines to be controlled simultaneously such that a total of the ramp up or ramp down rates of the wind turbines in each group does not exceed a ramp up or ramp down rate of the grid-code when the wind speed deviates from the range of wind power generation reference speed.

11. The system according to claim 10, wherein the operation unit determines a ramp down rate of a wind turbine within a range capable of braking the wind turbine through a pitch control and/or an electrical control when each of the wind turbines is braked.

12. The system according to claim 9, wherein the operation unit calculates a distance $s_{ij}$ between wind and each of the wind turbines using measured wind direction α, calculates a time for the wind to arrive at each wind turbine using the calculated distance and measured wind speed v, arranges a control start sequence of the wind turbines in order of shortest arrival time, and sequentially groups the wind turbines in order of the control start sequence.

13. The system according to claim 9, wherein the operation unit determines a time required for the wind to arrive at a wind turbine at which the wind arrives earliest in each group as the control end time $T_{Gn,end}$.

14. The system according to claim 9, wherein the operation unit determines a value calculated by subtracting a control processing time $t_{ctrl}$ from the control end time $T_{Gn,end}$ as the control start time $T_{Gn,start}$, in which the control processing time $t_{ctrl}$ is calculated by dividing a variance of wind power generation of each group by the ramp up or ramp down rate $R_{GC}$ of the grid-code.

15. The system according to claim 9, wherein if the control times of adjacent groups are overlapped, the operation unit performs an operation of adjusting the control end time $T_{Gn,end}$ and the control start time $T_{Gn,start}$ after performing the operation of deriving the control start time $T_{Gn,start}$.

16. The system according to claim 15, wherein the operation of adjusting the control end time $T_{Gn,end}$ and the control start time $T_{Gn,start}$ includes the operation of adjusting the control end time $T_{Gn,end}$ and the control start time $T_{Gn,start}$ in a reverse order starting from the N-th group to the first group by moving ahead the control start time $T_{Gn,start}$ and the control end time $T_{Gn,end}$ of a first controlled group as much as the overlapped time.

17. The system according to claim 9, further comprising a wind condition measuring apparatus for measuring the wind conditions including characteristics of the wind speed and wind direction, performed outside the wind farm.

18. The system according to claim 17, wherein three or more wind condition measuring apparatuses are disposed in a polygonal form.

19. The system according to claim 17, wherein the wind condition measuring apparatuses are disposed in at least two or more layers outside the wind farm.

20. The system according to claim 17, wherein the wind condition measuring apparatuses are disposed to be apart from the wind farm by a distance farther than a value calculated by multiplying capacity of the wind farm by maximum wind speed of a corresponding region and then dividing a result of the multiplication by the grid-code.

* * * * *